United States Patent [19]

Maheas

[11] Patent Number: 4,978,393
[45] Date of Patent: Dec. 18, 1990

[54] PROCESS FOR THE MANUFACTURE OF STOCKABLE DENSE ROAD ASPHALTS

[76] Inventor: René Maheas, 11 avenue du Coteau, Bouliac 33270 Floirac, France

[21] Appl. No.: 319,699

[22] Filed: Mar. 7, 1989

[51] Int. Cl.$^5$ .............................................. C08L 7/00
[52] U.S. Cl. .................................. 106/281.1; 106/280; 208/22; 208/23; 208/39
[58] Field of Search ............... 106/281.1, 280; 208/22, 208/39, 23

[56] References Cited

U.S. PATENT DOCUMENTS

| | | | |
|---|---|---|---|
| 1,954,997 | 4/1934 | Hirzel | 106/281.1 |
| 2,049,985 | 8/1936 | Wait et al. | 106/280 |
| 2,051,577 | 8/1936 | Schloss | 106/280 |
| 2,073,907 | 3/1937 | Scullin | 106/280 |
| 2,349,446 | 5/1944 | McGrane | 106/280 |
| 3,418,900 | 12/1968 | Bray et al. | 94/23 |
| 3,513,005 | 5/1970 | Bradshaw et al. | 106/280 |
| 3,868,262 | 2/1975 | Ohlson | 106/280 |
| 3,920,470 | 11/1975 | Berlrand | 106/280 |
| 4,008,095 | 2/1977 | Fukushima et al. | 106/280 |
| 4,196,922 | 4/1980 | Fabb et al. | 106/280 |
| 4,274,882 | 6/1981 | McAllister, Jr. | 106/280 |
| 4,383,864 | 5/1983 | Trujillo | 106/281.1 |

FOREIGN PATENT DOCUMENTS 2117156 7/1972 France.
WO83/00700 3/1983 PCT Int'l Appl..

Primary Examiner—Helane Myers
Attorney, Agent, or Firm—Foley & Lardner, Schwartz, Jeffery, Schwaab, Mack, Blumenthal & Evans

[57] ABSTRACT

A process for the manufacture of stockable dense road asphalt that is comprised of materials, having elements of a diameter from essentially zero to 10-30 mm, coated in a cutback or fluidified bitumen-based binder. The materials are separated into at least two granulometries. The first group is a grouping of the smallest elements. The second group is a grouping of the remaining elements. The first group is coated with a first bituminous binder emulsion which is a cationic cutback or fluidified bitumen emulsion with a fracture index greater than zero and having a residual binder viscosity measured on a Standard Tar Viscosimeter (10 mm, 25° C.) of less than 50 seconds. The second group is coated with a second bituminous binder emulsion which is a cationic cutback or fluidified bitumen emulsion with a residual binder viscosity measured on a Standard Tar Viscosimeter (10 mm, 25° C.) of between 1000 and 2000 seconds. Both the coated groups are then mixed together for a few seconds.

7 Claims, No Drawings

PROCESS FOR THE MANUFACTURE OF STOCKABLE DENSE ROAD ASPHALTS

The present invention concerns a process for the manufacture of stockable dense road asphalts principally for use in making and repairing roads, aerodrome runways, etc.

At present, stockable dense asphalts are manufactured by heating the materials and/or the coating binder, which is generally a cutback or fluidified bitumen.

The granulometry of dense asphalts is fixed by the graphs of the Laboratoire Central des Ponts et Chaussées or the Service d'Etudes Techniques des Routes et Aérodromes. This concerns materials of 0/D granulometry, that is, material having a diameter in the range from dust (0) to a diameter D. In fact, for the types of asphalt concerned, the diameter D is in the order of 10 to 30 mm. 0/D materials currently used in asphalts contain in the order of 5 to 10% in weight of small elements of material passing through an 80-micrometer sieve.

Briefly, according to known techniques, all the 0/D materials are coated either cold or, more generally, after being heated at a temperature between 120° and 150° C., with the binder itself heated to a temperature of about 100° C. Mixing time is in the order of a dozen or so seconds.

The binder usually used is either a cutback bitumen i.e. a mixture of bitumen and coal-tar oil, or a fluidified bitumen i.e. a bitumen to which petroleum solvent(s) is added.

This technique requires large investments because of the heating, in most cases, of the totality of gravel mass, from the smallest grains to the largest, at a relatively high temperature (120° to 150° C.).

Furthermore, when 0/D material are coated without heating, coating is difficult to carry out and heterogeneous distribution of the bituminous binder takes place, leading to excess coating on the smaller materials to the detriment of larger elements. Consequently, this leads to unhomogeneous coating comprising gravel grains that can become detached as they are not sufficiently stuck together by the bitumen.

The invention is aimed at compensating for the various inconveniences mentioned above.

To this end, the object of the invention is a process for the manufacture of stockable dense road asphalts consisting of 0/D materials coated in a cutback or fluidified bitumen-based binder, wherein the process consists of:
sorting said materials into at least two granulometries,
  the first grouping together the smallest elements and
  the other the grouping together the remaining material,
coating the first group with a first bituminous binder emulsion,
coating the second group of remaining material with a
  second bituminous binder emulsion of a viscosity substantially greater than that of the first emulsion,
and then mixing all 0/D material for a few seconds.

The materials are preferably sorted into two granulometries. The smallest material are those falling within the range between 0 and a maximal diameter fixed between 2 and 4 mm. The remaining material have a diameter greater than the maximal diameter chosen for the smallest material.

French norms for granulometries used in the field of road materials classify small material either in the 0/2 mm category or in the 0/4 mm category. In compliance with the process of the invention and to facilitate matters, either 0/2 mm material or 0/4 mm material will be considered to be the smallest material. Material having a granulometry outside this limit will constitute a second class of material. Of course, the boundary between the two sorts of element is not of critical importance and the maximal granulometry allowed for the category of small material can be between 2 and 4 mm and may even be, depending on the case in question, slightly above or below this range.

The small material will advantageously comprise between about 16 and 20% of materials passing through an 80-micrometer sieve.

The cutback or fluidified bituminous binder emulsion for coating small elements (0/2 mm or 0/4 mm) is preferably, and for example, a cationic emulsion whose fracture index is greater than 120 and whose residual binder viscosity, measured on a Standard Tar Viscosimeter (S.T.V.), is less than 50 seconds. This apparatus allows measurement, in compliance with the French norm NF T 66 005 for measurement of the pseudo-viscosity of cutback bitumens, of the efflux time of a certain amount of binder through a calibrated aperture at a fixed temperature. The viscosity value given above corresponds to a 10-mm aperture and a temperature of 25° C.

The proportion of emulsion can vary from about 30 to 80 liters per ton of material. The proportion depends on what the asphalt will be used for, the outer coating layers of the asphalt being richer in bitumen.

Once coated, the small material is stored for a certain length of time, a few hours to a few days for example, in order to obtain good sticking of bitumen to gravel (maturing of asphalt) in particular. This asphalt can be kept in stock for a long time, practically indefinitely, as the constituent elements do not agglomerate during storage. This allows them to be manipulated in storage hoppers, transfer belts or elevators. They behave in the same way as uncoated materials.

Coating of the remaining elements (2/D mm or 4/D mm, according to the initial choice) is carried out, preferably and for example, with a cationic cutback or fluidified bitumen emulsion of a much higher viscosity than that of the small material binder. Viscosity of the residual binder of this emulsion, measured on a S.T.V. under the same conditions as defined above (10 mm, 25° C.), is between 1000 and 2000 seconds for example. Of course, the viscosity range indicated above can be exceeded, values may be above or below this range. The proportion of this emulsion can vary from about 50 to 100 liters per ton of material.

The binders used for the two classes of material (small and others) are used with or without heating.

At the end of the coating step of large material (2/D mm or 4/D mm), the small coated material are incorporated by continuing mixing for a few seconds.

A perfectly homogeneous and indefinitely stockable 0/D mm asphalt is thus obtained.

The proportion of small elements to large elements in one ton of asphalt can be a very variable ratio, depending on the usage aimed at of the asphalt in question.

The process described above is known as discontinuous.

The process of the invention may also be implemented in a continuous manner by incorporating the small elements, previously coated, with the large elements during coating, more particularly during the latter third of the coating step.

Finally, according to a variant of the process in the case where we wish to use an emulsion whose residual binder is better than those indicated, or even pure bitumen emulsions, for coating the large material, the small material are coated without being heated while the large material is heated, before being coated, to a temperature less than or equal to 90° C., the emulsion used for these large material being cold or hot (less than or equal to 90° C.).

The finished asphalt obtained according to this variant is stockable before use for a shorter period of time than the asphalt prepared according to the process described above but has the advantage of hardening more quickly.

What is claimed is:

1. Process for the manufacture of stockable dense road asphalt comprising gravel material having a diameter of essentially dust to about 10 to 30 mm (O/D) coated in a cutback or fluidified bitumen-based binder wherein the process comprises:

sorting said material into at least two granulometries, the first gramulometry grouping together a first group of small material, the first group having a granulometry in the range from essentially 0 to a maximal diameter fixed between 2 and 4 mm and the other grouping a second group of the remaining material, the second group having a granulometry in the range from the maximal diameter of the first group to a diameter fixed between 10 and 30 mm;

coating said first group with a first bituminous binder emulsion, said first emulsion being a cationic cutback or fluidified bitumen emulsion with a fracture index greater than 120 and having residual binder viscosity, measured on a Standard Tar Viscosimeter (10 mm, 25° C.) of less than 50 seconds;

coating the second group with a second bituminous binder emulsion, said second emulsion being a cationic cutback or fluidified bitumen emulsion with residual binder viscosity, measured on a Standard Tar Viscosimeter (10 mm, 25° C.), of between about 1000 and 2000 seconds;

and then mixing said first and second groups for a few seconds.

2. Process according to claim 1 wherein the proportion of first emulsion is in the order of 30 to 80 liters per ton of material.

3. Process according to claim 1 wherein the proportion of second emulsion is in the order of 50 to 100 liters per ton of material.

4. Process according to claim 1 wherein mixing of small materials with other materials is carried out during the last step in the coating of the latter.

5. Process according to one of claim 1 wherein said remaining or large materials are heated at a temperature less than or equal to 90° C.

6. Process according to claim 1 wherein the small materials are in the range of 0/4 mm and, preferably, 0/2 mm.

7. Process according to one of claim 1 wherein, in the small materials, the proportion of materials passing through an 80-micrometer sieve is between about 16 and 20%.

* * * * *